L. F. CURRIER.
Rice Cleaner.
No. 16,469.
Patented Jan. 27, 1857.
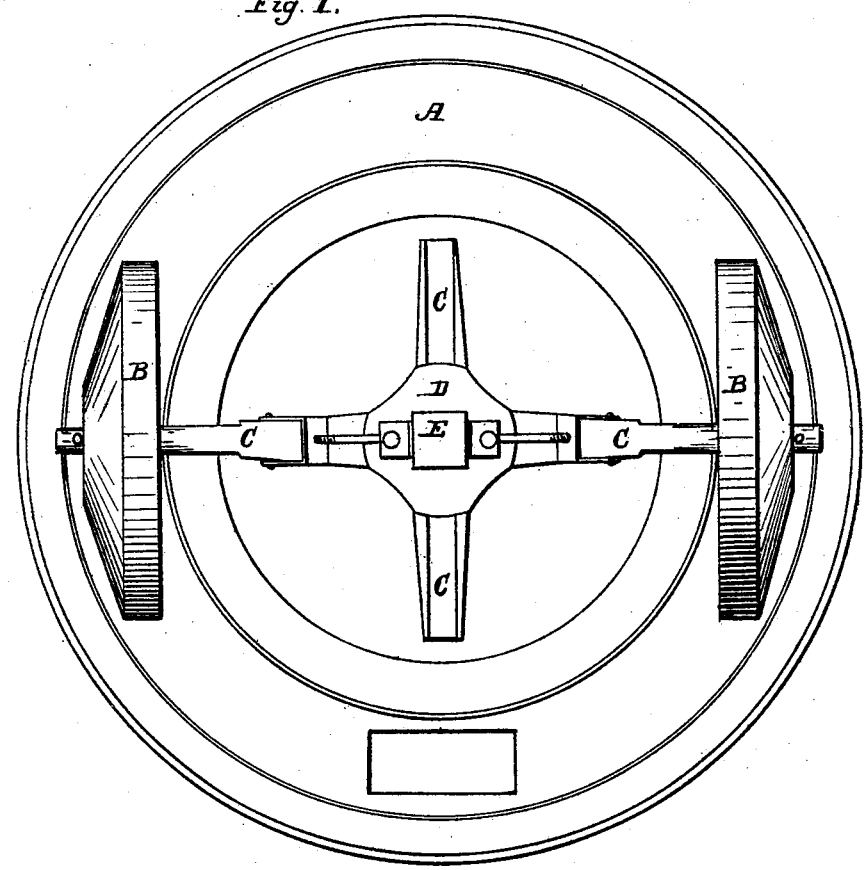
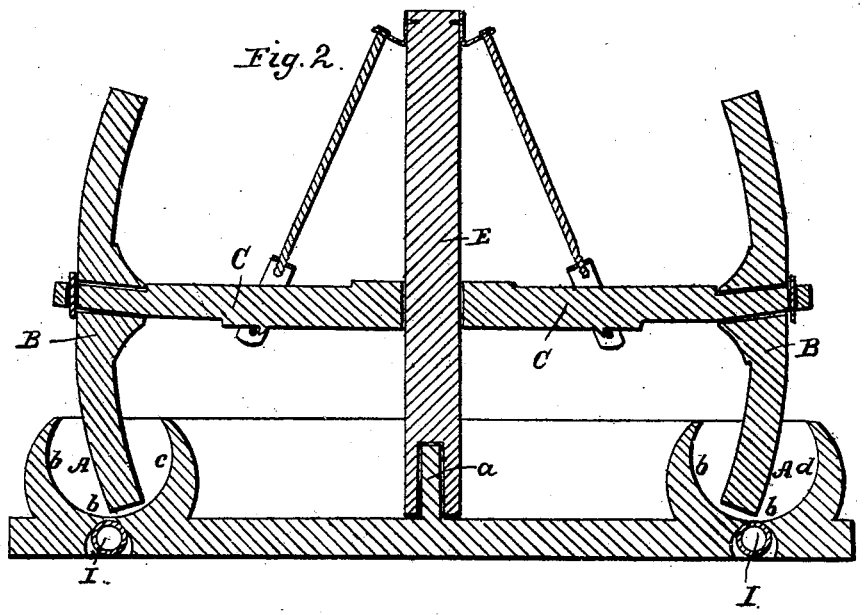

UNITED STATES PATENT OFFICE.

LEWIS F. CURRIER, OF PORTLAND, MAINE.

IMPROVEMENT IN MACHINES FOR HULLING RICE.

Specification forming part of Letters Patent No. 16,469, dated January 27, 1857.

*To all whom it may concern:*

Be it known that I, LEWIS F. CURRIER, of Portland, in the county of Cumberland and State of Maine, have invented an Improvement in Skinning Rice Kernels; and I do hereby declare that the same is fully described and represented in the following specification and the accompanying drawings, of which—

Figure 1 exhibits a top view of the mechanism employed by me. Fig. 2 is a vertical section of the same, such section being taken through the wheels or rollers to be hereinafter described.

In carrying out my invention I employ a circular or endless trough A, and one or more wheels or rollers B B, arranged therein and moved around within the same, such wheel or wheels being placed on one or more suitable arms C C, which radiate or extend from a hub or common center piece D, connected with a vertical shaft E, that turns on a pivot or the equivalent therefor, arranged as shown at $a$ in Fig. 2. By inspection of said Fig. 2 it will be perceived that the trough is formed with a curved or flaring bottom, as shown at $b\ b\ b$, and also with curved or inclined sides, as shown at $b\ c$ and $b\ d$, the arrangement of the said bottom and sides or curves thereof with respect to one another being as shown in said figure. This form of the trough in transverse section is an important feature in my invention, as without it it would be difficult, if not impossible, to skin the rice by the peculiar action of the wheels or rollers. It will be seen that each wheel is a disk and made dishing, and that the journals of the axle are arranged so as to be inclined upward as they extend from the axle; also, that the convex sides of the wheels are arranged outward and next to the outer side of the trough and so as to bring the concave sides of the wheels next to the inner side of the trough. This arrangement of convex and concave surfaces of the wheel with respect to the sides of the trough serves to prevent the rice from being forced out of the trough and operates much better than an undished wheel in the trough.

Extending along underneath the bottom of the trough is a circular passage or tube I for the reception of steam and heated air for the purpose of heating the trough and its contents, and thereby facilitating the process of removing the skins from the kernels. The heat is to be applied at such times as may be necessary, and particularly just before the wheels are to be set in motion, in order that the rice may be warmed up to the necessary temperature. The rolling action of the wheels or the friction of the kernels against one another will generate heat, as is the case when they are subjected to the action of the pestle and mortar. As an auxiliary means of heating and to be employed as circumstances may require, I use the tube and heated air or steam therein, as stated.

In operating on the rice after it has been hulled it is to be placed in the endless trough, which may be filled to about two-thirds of its depth, and so that the wheels, when their hubs and arms are turned horizontally, may roll upon and among the kernels of the grain. It should be borne in mind, however, that the wheels are to be elevated above the bottom of the trough, and by no means allowed to come in contact therewith or be so near to the same as to crush or break the rice by pressing it against said bottom. While rolling around in the mass of rice, each wheel forces the kernels downward and causes them to pass upward between the sides of the wheel and those of the trough, and as the wheel leaves them the peculiar shape of the sides of the trough causes them to fall back into the path of the wheel, so that it may again act upon them in a similar manner when it next comes around into that part of the trough where they may be situated.

It is well known that in order to remove the skin or inner covering of the rice kernel the usual process has been to place the rice in a mortar and subject it to the stamping action of a pestle or beater caused to fall with rapid strokes upon the mass and to descend therein to within a few inches or a short distance from the bottom of the mortar, such mortar being shaped or formed with a dishing bottom and sides that approach one another or contract as they rise upward from the bottom toward the mouth of the mortar.

In order to secure all the advantages of the mortar and its pestle and to gain others not incident thereto, I have devised an apparatus or mechanism consisting of an endless trough and wheels constructed and operated as described. With such devices I am not only enabled to skin the rice, but to polish or "pearl" it, thus saving to a great extent, if not entirely, the common process of effecting the "pearling" operation, which becomes necessary when the pestle and mortar are used as described. The rolling operations of the wheel upon the rice have not that tendency to break the kernels that results from the concussions or blows to which they are subjected when under the action of the pestle and mortar, because in my process of treating them they are simply crowded and pressed together and caused to slide upon one another and each to abrade that against which it is pressed.

Besides the above, another important advantage results from my method of treating the rice as by it, I can perform the operation in much less time and with much less labor and expense than are incurred in the beating process.

Now I do not claim the use of a wheel and trough either for pressing or mixing substances, as this is a common application of such devices in the manufacture of powder and in crushing ores, as well as pulverizing or mixing various materials, and although I believe I am the first person who may have conceived the employment of and used wheels and a trough for the process of skinning and pearling rice, I presume I cannot claim the same so far as a new use of them alone is concerned; but What I do claim is—

The improvement in the construction and application of the wheel or wheels to the endless trough, made substantially as described, whereby advantages in skinning rice are gained, as specified, such improvement consisting in the dished wheels applied or arranged in such a trough essentially as set forth.

In testimony whereof I have hereunto set my signature this 12th day of June, A. D. 1856.

LEWIS F. CURRIER.

Witnesses:
  R. H. EDDY,
  F. P. HALE, Jr.